United States Patent [19]
Giedris

[11] Patent Number: 5,868,356
[45] Date of Patent: Feb. 9, 1999

[54] FASTENER SYSTEM USING BIANGULAR COUNTERSINK GEOMETRY

[75] Inventor: James M. Giedris, Falmouth, Me.

[73] Assignee: The Boeing Company, Seattle, Wash.

[21] Appl. No.: 712,670

[22] Filed: Sep. 13, 1996

[51] Int. Cl.[6] .................................................. F16B 19/04
[52] U.S. Cl. ...................... 244/132; 411/507; 411/424; 411/426; 411/378; 29/509; 29/524.1; 403/405.1; 403/388; 403/408.1
[58] Field of Search ............................ 244/132; 411/507, 411/424, 426, 378; 29/509, 522, 526; 403/408.1, 388, 405.1

[56] References Cited

U.S. PATENT DOCUMENTS

| Re. 30,997 | 7/1982 | Briles . |
|---|---|---|
| 3,815,220 | 6/1974 | Briles . |
| 3,849,964 | 11/1974 | Briles . |
| 3,921,364 | 11/1975 | Briles . |
| 3,933,025 | 1/1976 | Briles . |
| 3,934,330 | 1/1976 | Briles . |
| 4,000,680 | 1/1977 | Briles . |
| 4,048,708 | 9/1977 | Briles . |
| 4,050,833 | 9/1977 | Briles . |
| 4,051,592 | 10/1977 | Briles . |
| 4,086,839 | 5/1978 | Briles . |
| 4,159,666 | 7/1979 | Briles . |
| 4,370,081 | 1/1983 | Briles . |
| 4,493,141 | 1/1985 | Krezak . |
| 4,583,897 | 4/1986 | Briles . |
| 4,609,315 | 9/1986 | Briles . |
| 4,765,787 | 8/1988 | Briles . |
| 4,810,142 | 3/1989 | Briles . |
| 5,129,771 | 7/1992 | Briles . |

*Primary Examiner*—Galen L. Barefoot
*Attorney, Agent, or Firm*—Christensen O'Connor Johnson & Kindness PLLC

[57] ABSTRACT

A biangular countersink in a skin panel to be joined to an underlying support member includes a frustoconical base portion defining a large included angle and an extremely shallow outer portion cut at a very small acute included angle. Fasteners usable with the countersink have heads with frustoconical undersides matching the deeper base portion of the countersink and rounded heads sized to fit within the shallow, acutely angled outer portion of the countersink. The combination of fastener and biangular countersink reduces annular grooves or "halos" which typically are formed around conventional flush head fasteners.

17 Claims, 9 Drawing Sheets

FASTENER SYSTEM USING BIANGULAR COUNTERSINK GEOMETRY

FIELD OF THE INVENTION

The present invention relates to fastener systems for joining panels, particularly aircraft skin panels, to underlying supports.

BACKGROUND OF THE INVENTION

Aircraft skin panels typically are joined to underlying stringers or other supports by flush head fasteners, such as rivets. It is desirable that exposed surfaces of the skin panels be smooth for aerodynamic efficiency, for increased adhesion and uniform application of protective films and paints, and for aesthetic purposes. A glossy, smooth painted surface is more pleasing to the eye than a dimpled one.

In a conventional flush head fastener installation system, the holes for receiving rivets have frustoconical countersinks in the skin panel to receive matching fasteners having frustoconical surfaces under the heads. A perfect knife edge at the periphery of the fastener head is not possible; it necessarily is rounded. The rounded periphery of the fastener head, as compared to the frustoconical countersink, results in an annular groove or "halo" surrounding the fastener head.

For example, with reference to FIG. 1, in a known riveting system the included angle $\alpha$ of the underside of the head portion 10 of a rivet R is 100°, and the countersink 12 is cut in the skin panel 14 to match. The shank 16 of the rivet is cylindrical and, prior to formation of the upset 18, has a diameter D less than the corresponding diameter of the drilled hole 20 cut in the stringer or other support member 22 and the lower portion of the skin panel. Drilled hole 20 meets the countersink 12 at a corner 24 which typically is located closer to the abutting surfaces 26 of the outer skin 14 and underlying support 22 than to the exterior surface 28 of the skin. Prior to formation of the upset 18, the rivet can have a dome head, represented by the broken line 30 in FIG. 1, and the shank 16 is of substantially uniform circular cross-section as represented by broken lines 32. When the rivet is crushed by pressure applied by oppositely disposed anvils, the shank 16 of the rivet expands, the domed head 30 is flattened, the upset 18 is formed, and the skin panel 14 is clamped to the support 22. As noted above, since the rivet head cannot be formed with a perfect knife edge, the maximum diameter E of the rivet head is less than the diameter E' of the countersink 12 at the location where it opens at the exterior surface 28 of the skin panel. An annular groove or halo 34 of a depth F and width G is formed around the rivet head.

Dimensions F and G are at least partly functions of permissible tolerances pertaining to the rivet head at the time of manufacture. In the past, one way in which the halo problem has been attacked is to require rivet manufacturers to produce rivets with a rivet head height F of smaller and smaller dimensions. This increases the cost of the rivets, and practical limits have been reached without a completely satisfactory solution to the halo problem.

An alternative geometry disclosed in U.S. Pat. No. 4,000, 680 is shown in FIG. 2 and FIG. 3. Skin panel 14 is joined to a stringer or underlying support 22 by the modified rivet R' which, prior to being crushed by the oppositely disposed anvils A, has a substantially cylindrical shank 16 of a diameter D less than the diameter D' of the hole 20 through the support 22 and lower portion of skin panel 14. As for the riveting system of FIG. 1, the rivet head has a frustoconical underside, and the countersink 12 in the skin panel is cut at an identical angle. However, in the geometry of FIG. 2 and FIG. 3, the depth F of the rivet head from the frustoconical underside to the exterior (top) of the head is deliberately formed as a cylinder coaxial with the rivet shank 16. In addition, rather than using a simple domed top, the rivet head is formed with an annular "ring dome" 36 with a depression 38 at the center. The more complicated countersink is formed by a cutter of the type shown in FIG. 4. The cutter has a nose portion 40 of a diameter D' larger than the diameter D of the shank of the rivet with which the cutter is intended to be used. An angled, frustoconical portion 42 of the cutter transitions from the diameter D' of the nose portion to the larger diameter E' of a larger cylindrical portion of the cutter.

Returning to FIG. 2, the diameter E of the rivet head is slightly smaller than the diameter E' of the outer cylindrical portion of the countersink. As seen in FIG. 3, when the rivet is crushed to form the upset 18 by the opposing anvils A, the shank 16 of the rivet expands, and the ring dome is flattened, forcing the rivet head outward to substantially fill the countersink.

The riveting system of FIGS. 2 and 3 has been reasonably effective in eliminating or at least reducing rivet haloes. However, the system is expensive, due to the complicated geometry, tight tolerances, fastener type and license fees. One reason for the tight tolerances is that an additional stress point is added at the junction 44 of the outer cylindrical portion 46 of the countersink and the frustoconical portion 48. As currently used, this junction is located at least 0.014 inch below the exterior surface of the skin panel (for shank diameters of 0.125") and even deeper for rivets of increasing diameter. For example, for rivet diameters nominally 0.312 inch (10/32") the junction 44 is at least 0.033 inch below the exterior surface of the skin panel for systems currently in use.

SUMMARY OF THE INVENTION

The present invention provides an improved, halo-reducing fastener system for joining a panel, particularly an aircraft skin panel, to an underlying support member. The fastener system geometry comprises a biangular countersink including a frustoconical base portion having a large included angle, preferably 100° (±5°), and an extremely shallow outer section cut at a very small acute included angle of 15° to 20°, preferably about 20°. Fasteners usable in the system of the present invention can be essentially conventional, having heads with frustoconical undersides matching the deeper base portion of the countersink and rounded heads sized to fit within the shallow, acutely angled outer portion of the countersink.

The junction of the biangular countersink, i.e., between the differently angled base and outer portions, is positioned no more than 0.006 inch below the outer surface of the skin panel. This prevents introducing a potentially troublesome stress point. For cladded skins which have a thin outer layer of malleable substantially pure aluminum over a more rigid alloy underlayer, such junction is no more than 0.001 inch to 0.002 inch below the clad, preferably no lower than the underside of the clad.

In addition, it is preferred that the fastener head be of a diameter equal to or slightly less than the diameter of the outer portion of the biangular countersink. If larger fastener heads are used, a "hydraulic lock" effect is possible which may trap sealant below the fastener head and affect the integrity of the joint.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention provides a novel fastener system using a biangular countersink geometry in conjunction with a conventional flush head fastener, such as a dome head rivet. The novel system eliminates or greatly lessens the typical annular groove or "halo" formed around the periphery of the fastener head when it is installed to connect an aircraft skin panel to an underlying support member.

Figure 5:
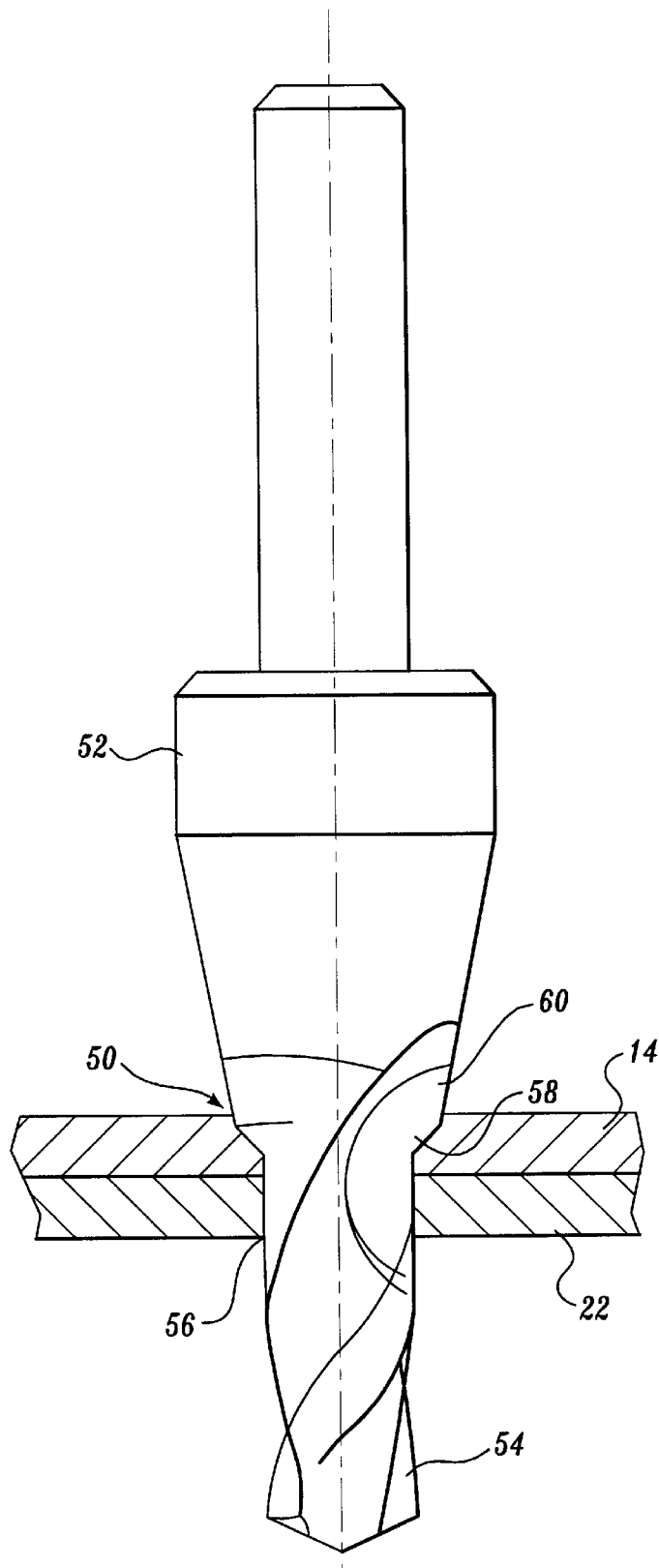
FIG. 5 is an enlarged vertical section of a skin panel and underlying support member and cutter of the fastener system in accordance with the present invention, illustrating formation of the novel countersink used in the fastener system of the present invention.

Referring to FIG. 5, the biangular countersink 50 preferably is formed by a cutter 52 having a cylindrical nose portion 54 of constant diameter. Nose portion 54, forms a cylindrical hole 56 in the underlying support member 22 and in the base portion of the skin panel 14. The cutter has an intermediate frustoconical portion 58 defining a first included angle, and an adjacent frustoconical portion 60 defining a second included angle much smaller than the first.

Figure 6:
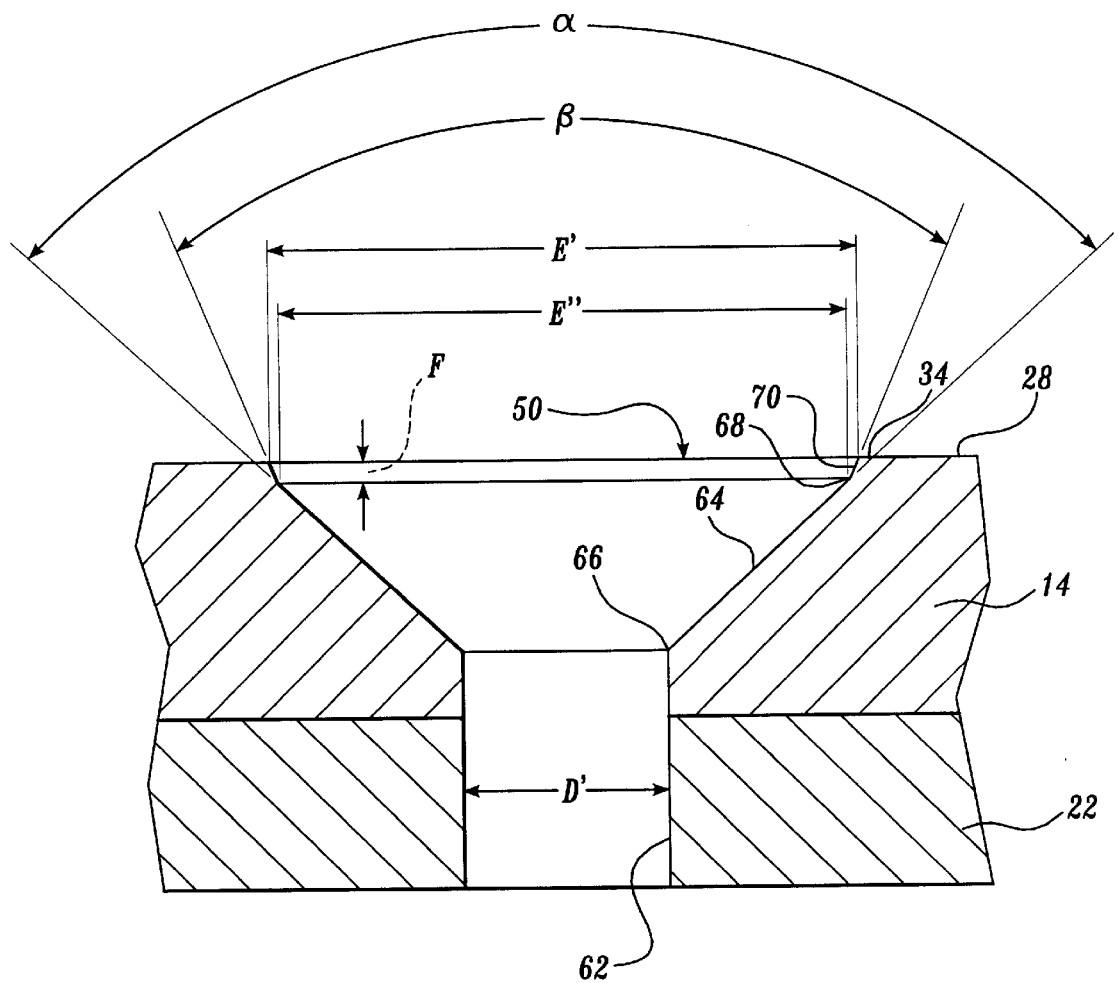
FIG. 6 is a further enlarged vertical section through the panel and support of FIG. 5, but with the cutter removed to reveal the details of the countersink.

More specifically, referring to FIG. 6 which shows the drilled hole prior to installation of a fastener, the bottom cylindrical portion 62 of the hole has a diameter D'. Portion 62 extends completely through the underlying support 22, and part way into the skin panel 14. The base portion 64 of the countersink defines a large included angle α, preferably 100° (±5°), and extends from its junction 66 with the cylindrical hole 62, to an outer junction 68 with the outer portion 70 of the countersink. Outer portion 70 of the countersink defines a very small, acute included angle β of 15° to 20°, preferably about 20°. In the drawings, dimension E' represents the diameter of the countersink at the exterior surface 28 of the skin panel 14, and dimension E" represents the smaller diameter of the countersink at the junction 68 of the base and outer portions.

Figure 7:
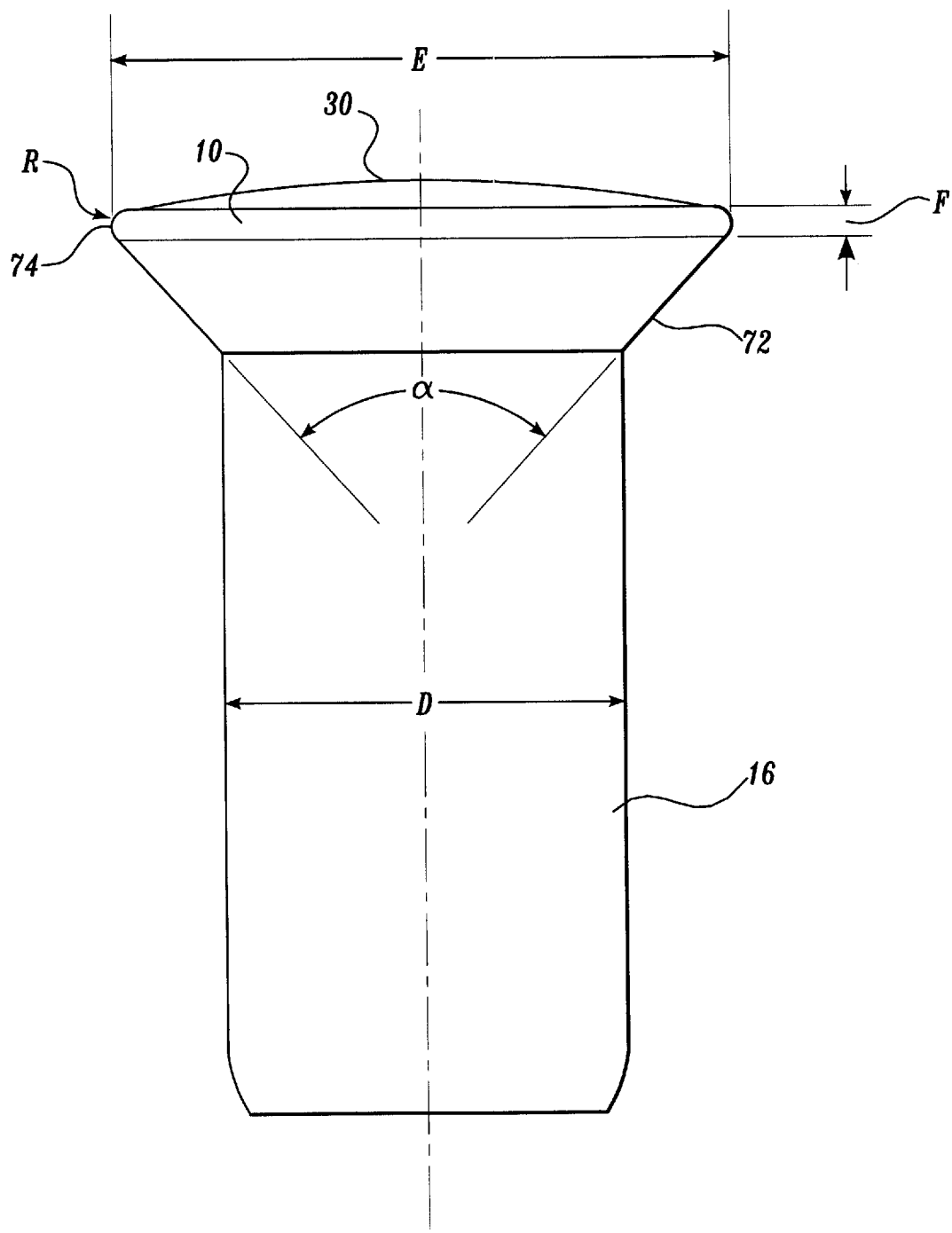
FIG. 7 is an enlarged side elevation of a fastener used in the fastener system of the present invention.

A flush head fastener in the form of a rivet R intended to be used in conjunction with the countersink of FIG. 6 is illustrated in FIG. 7. Such fastener is essentially conventional, having a long cylindrical shank 16 of uniform diameter D and a head portion 10 including frustoconical underside 72 defining an angle α identical to the angle defined by the base portion of the countersink. Since no flush head fastener can be formed with a perfect knife edge at the top, the fastener head necessarily has a somewhat rounded periphery 74, the depth of which is identified by reference letter F in FIG. 7. The top 30 of the rivet can be of conventional flush/dome shape.

Figure 8:
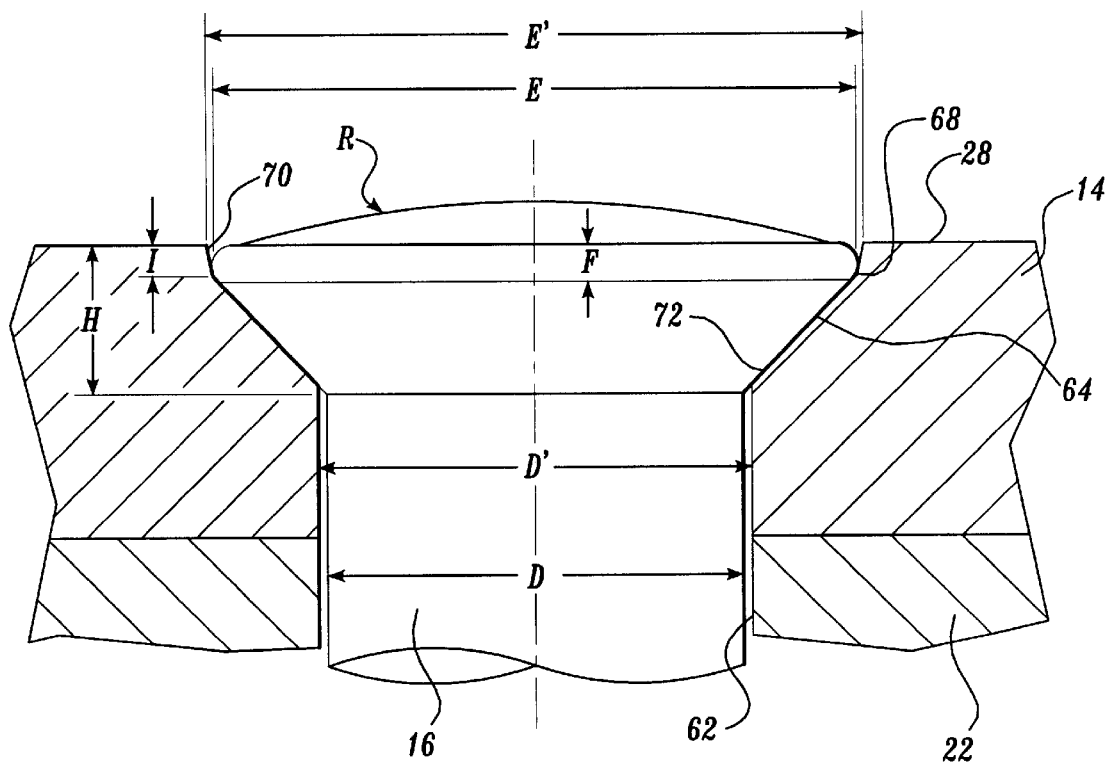
FIG. 8 is a further enlarged side elevation of the head portion thereof with the fastener installed in a countersink, but prior to being crushed.

It is the relative dimensions of the countersink and fastener that cooperate to provide the improvement of the present invention, namely, a securely connected skin panel and underlying support having a reduced halo. Some of the relationships are based on known systems, whereas others are not. FIG. 8 illustrates a representative installation prior to crushing of a rivet R. It should be noted that the dimensions are somewhat exaggerated in the drawings for ease of illustration, the actual preferred dimensions are given below.

Figure 1:
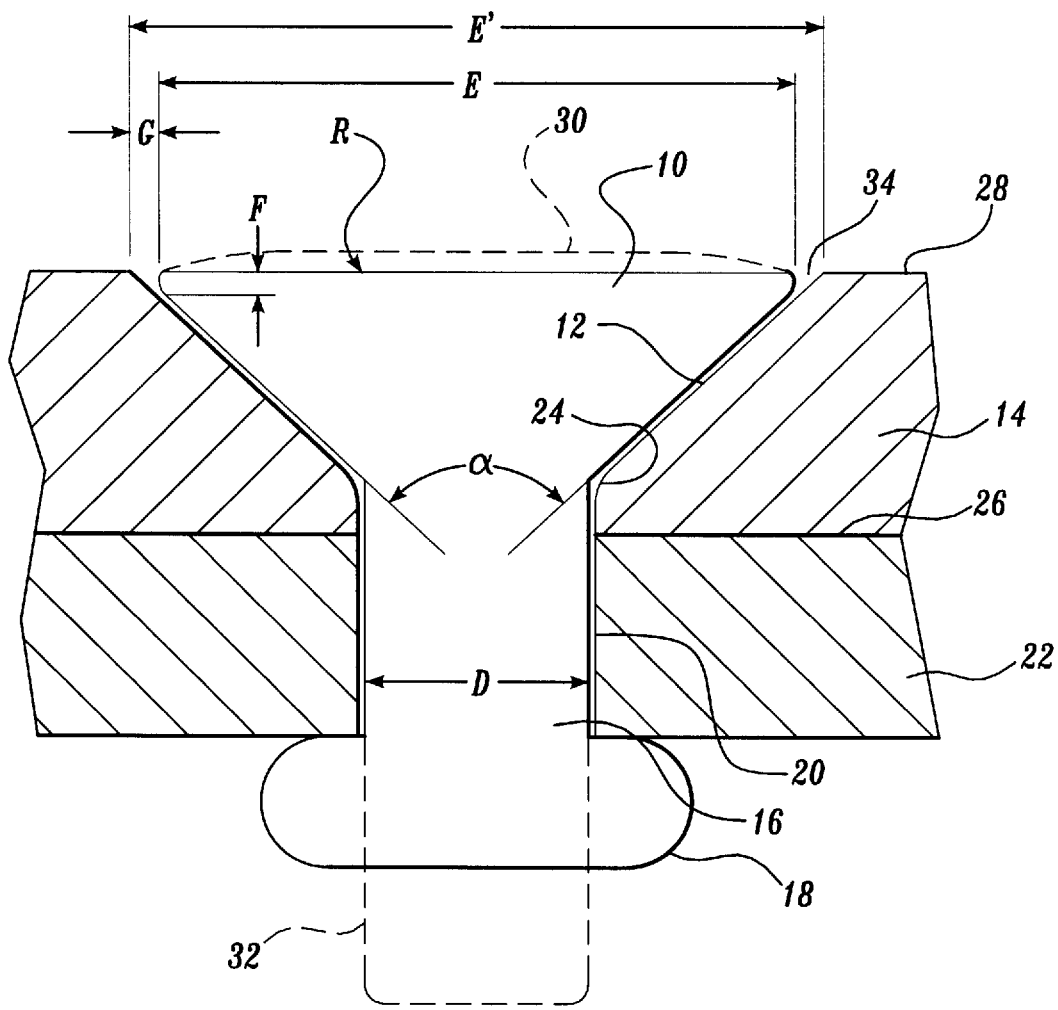
FIG. 1 is an enlarged vertical section through a panel and underlying support member in the area of a connecting rivet, illustrating a conventional riveting system.
Figure 2:
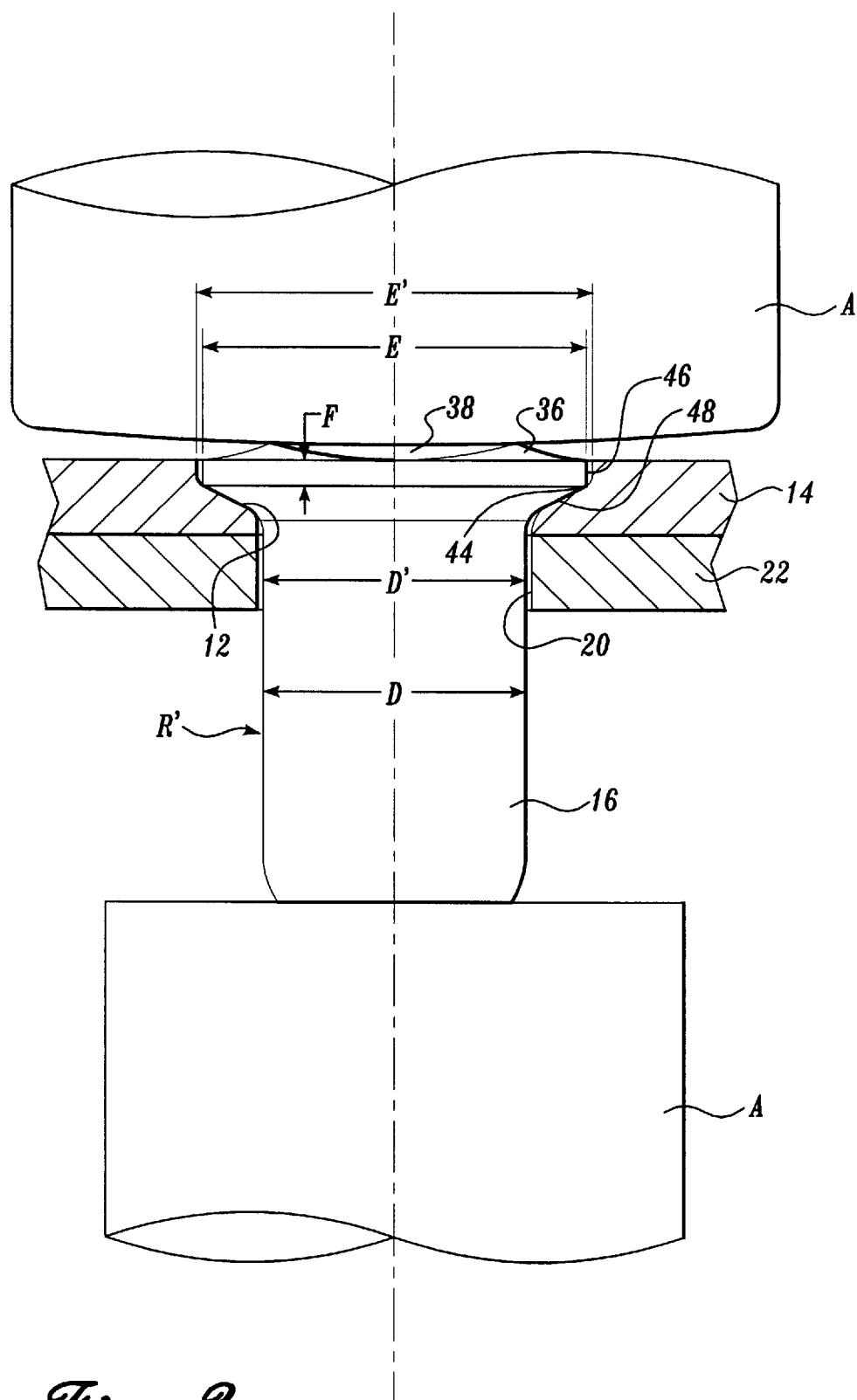
FIG. 2 is a vertical section through a panel and underlying support member in the area of a rivet, illustrating another conventional riveting system.
Figure 3:
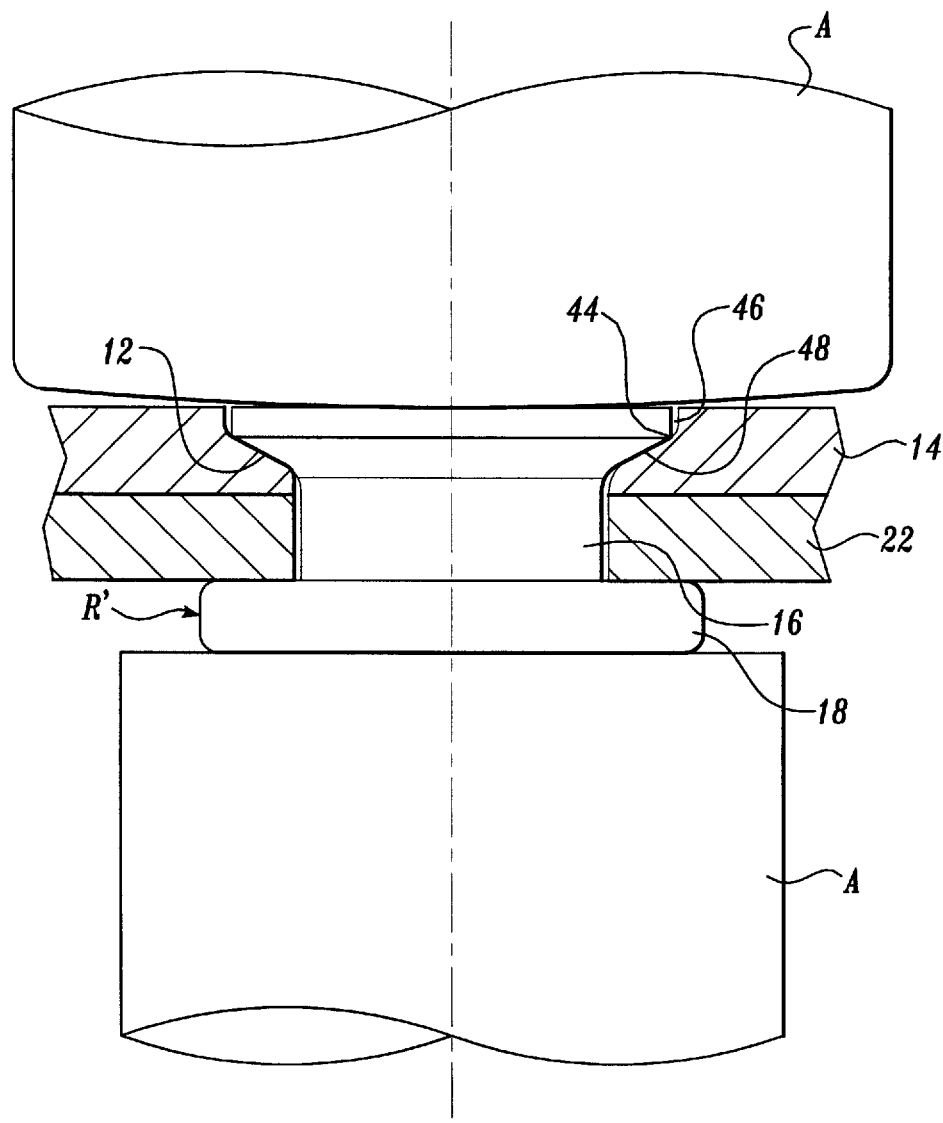
FIG. 3 is a vertical section corresponding to FIG. 2, but with the rivet of FIG. 2 crushed for clamping the panel and support member together.
Figure 4:
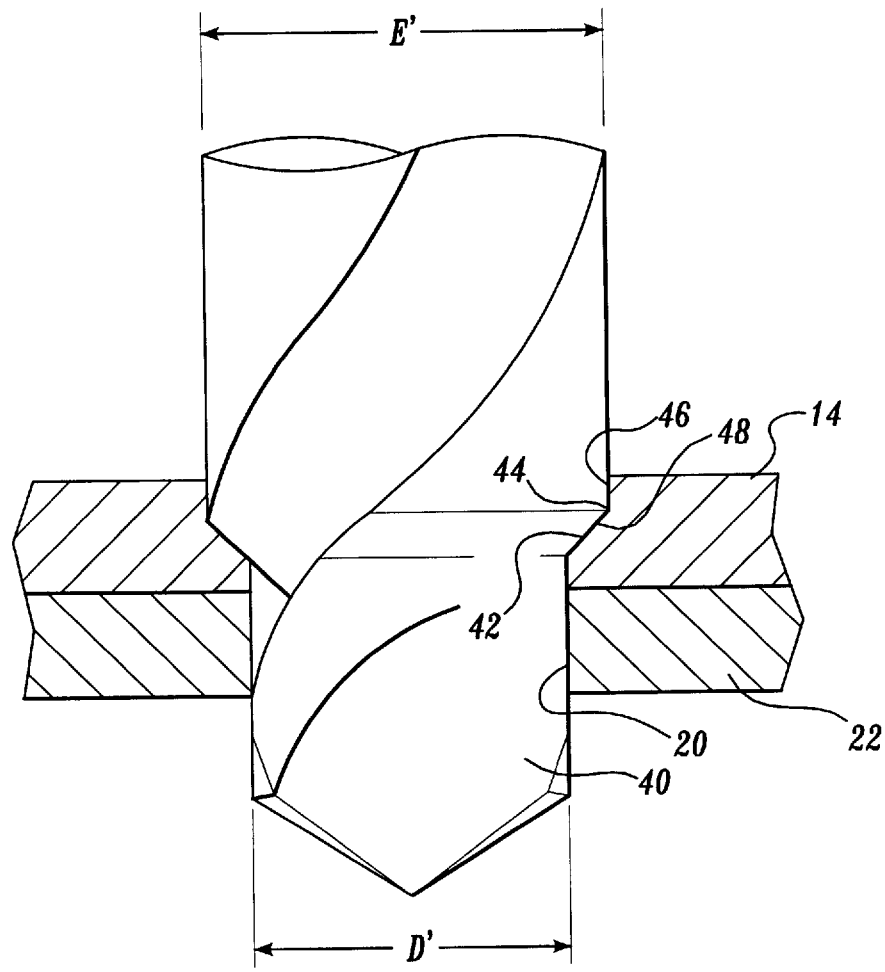
FIG. 4 is a vertical section through the panel and support member of FIGS. 2 and 3, illustrating formation of the countersink used in the riveting system shown in those drawings.

The frustoconical underside 72 of the head of rivet R rests flush against the corresponding frustoconical portion 64 of the countersink 50, both having identical included angles, preferably 100° (±5°). The diameter D of the rivet shank 16 is less than the diameter D' of the corresponding portion of the cylindrical hole 62. The depth H of the countersink preferably is the same as for known riveting systems of the type shown in FIG. 1 or FIGS. 2–3. The height F of the rivet head is substantially the same as rivets currently in use (i.e., for a system of the type shown in FIG. 1) and preferably is identical or nearly identical to the depth I of the outer portion 70 of the countersink. The diameter E of the rivet head is nearly the same as the maximum diameter E' of the countersink where the countersink opens at the exterior surface 28 of the skin panel.

Of these dimensions, one of the most important is the depth I of the outer portion of the countersink. The acutely angled outer portion 70 of the countersink passes closer to the head of the fastener than known systems of the type shown in FIG. 1, and is much more shallow than the outer portion of the countersink for the system shown in FIGS. 2–3. In accordance with the present invention, the outer portion 70 of the countersink is preferably no deeper than 0.006 inch. Thus, the junction 68 of the lower countersink portion 64 and outer countersink portion 70 lies no lower than 0.006 inch from the top surface of the skin, so that deformation in this area as the fastener is installed does not introduce an undesirable stress in the aircraft skin. A deeper outer portion would require fasteners of special design, greatly increasing the expense as compared to the present invention in which standard fasteners can be used. The fastener preferably also is very malleable, so as to deform to fill the drilled hole and countersink.

For some aircraft skins currently used, an outer layer or "clad" of substantially pure aluminum overlies a more rigid alloy underlayer. The clad can vary in thickness from about 0.001 inch to 0.004 or 0.006 inch depending on the thickness of the skin panel. In this situation, it is preferred that the junction 68 of the lower countersink portion 64 and outer countersink portion 70 lie no more than about 0.001 inch to about 0.002 inch below the bottom of the clad, and preferably no lower than the bottom of the clad. This assures that, for cladded skins, an undesirable stress point is not introduced substantially below the very malleable clad.

Figure 9:
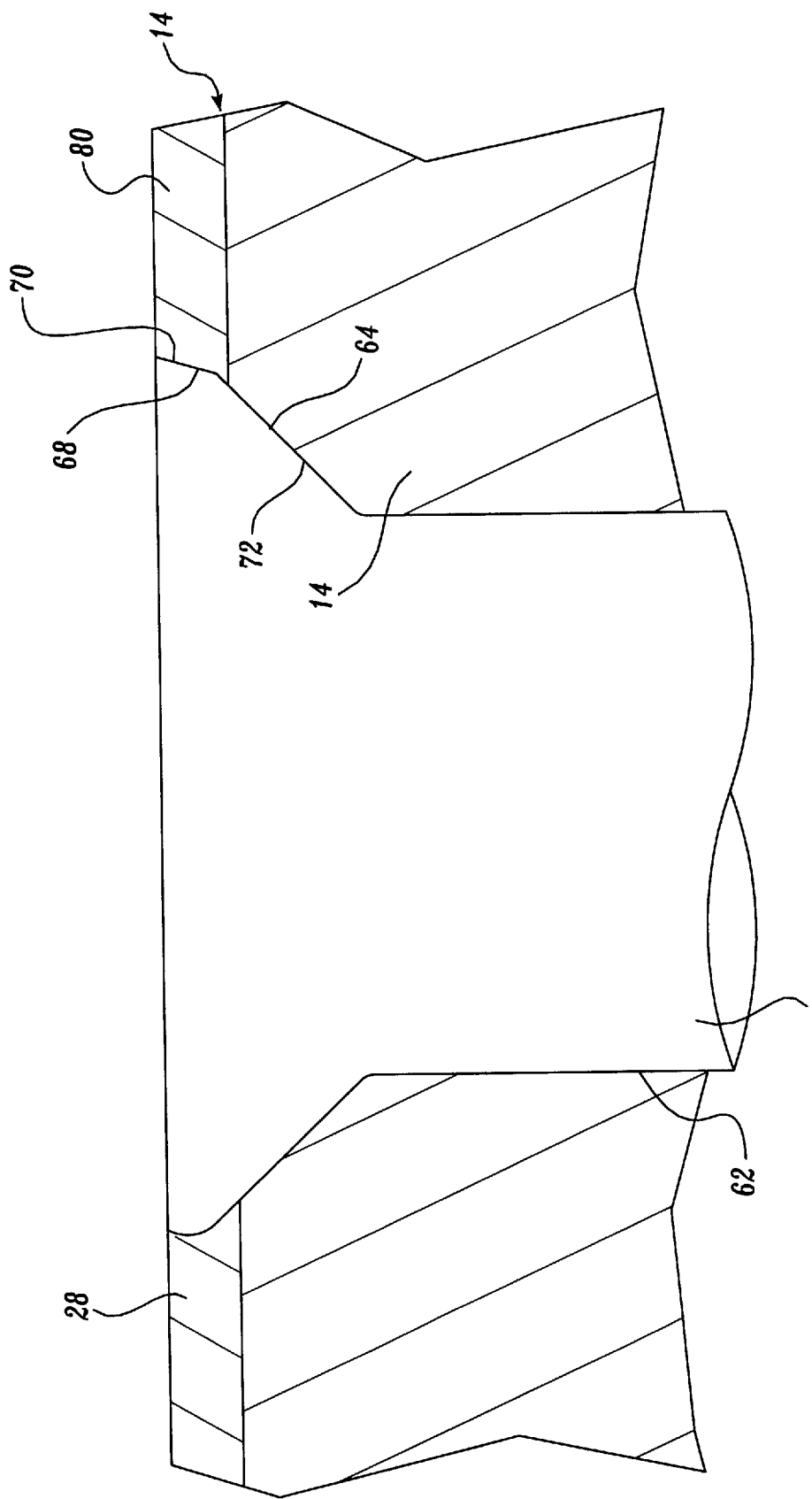
FIG. 9 is a vertical section corresponding to FIG. 8, but after crushing of the shank of the fastener.

FIG. 9 shows a fastener in accordance with the present invention, after installation. The shank 16 of the fastener has expanded to substantially fill the cylindrical hole 62. It can be seen more clearly that the junction 68 referred to above is located within the clad 80 of the skin panel 14. FIG. 9 is based on an actual microphotograph, and it can be seen that at one side (to the right of FIG. 9) the rivet head has deformed to almost precisely the shape of the countersink. At the other side (toward the left) the countersink has deformed in the area of the clad. The FIG. 9 installation resulted from a rivet having a head diameter slightly greater than the maximum diameter of the outer countersink portion, and no substantial halo was formed.

However, if the system in accordance with the present invention is used consistently with oversized rivet heads, in some instances a "hydraulic lock" effect is possible which may trap sealant below the head and affect the integrity of the joint. Consequently, it is preferred that the tolerances for the outer countersink section and fastener head diameter be set so as to avoid an oversize relationship of the fastener head to the countersink. The currently preferred dimensions are given in Tables 1 to 3 below.

With respect to the bore and shank diameters D' and D, the preferred dimensions are:

TABLE 1

| Normal fastener shank size (32nds) | Hole diameter D' | Fastener shank diameter D (±.001) |
|---|---|---|
| 5 | .159–.165 | .157 |
| 6 | .190–.196 | .188 |
| 7 | .228–.235 | .221 |
| 8 | .255–.261 | .251 |
| 9 | .290–.298 | .284 |
| 10 | .316–.323 | .313 |

Note that the shank diameter will always be at least 0.001 inch less than the hole diameter.

With respect to the countersink diameters E' and E" and the rivet head diameter E, the preferred dimensions are:

TABLE 2

| Nominal fastener size (32nds) | Countersink diameter E" (±.001) | Countersink diameter E' (±.001) | Fastener head diameter E |
|---|---|---|---|
| 5 | .2355 | .2370 | .2310–.2350 |
| 6 | .2856 | .2880 | .2810–.2850 |
| 7 | .3200 | .3218 | .3140–.3180 |
| 8 | .3850 | .3910 | .3790–.3810 |
| 9 | .4186 | .4200 | .4120–.4160 |
| 10 | .4744 | .4780 | .4680–.4720 |

Note that the fastener head diameter E preferably is 0.0005 inch to 0.0024 inch less than the diameter E" of the countersink at the junction of its inner and outer portions. This relates to this volume of fastener head being displaced.

With respect to the total countersink depth H and the depth G of the outer countersink portion, the preferred dimensions are:

TABLE 3

| Nominal fastener shank size (32nds) | Countersink depth H (REF.) | Outer depth G (REF.) |
|---|---|---|
| 5 | .0373 | .0040 |
| 6 | .0453 | .0041 |

TABLE 3-continued

| Nominal fastener shank size (32nds) | Countersink depth H (REF.) | Outer depth G (REF.) |
|---|---|---|
| 7 | .0450 | .0034 |
| 8 | .0600 | .0034 |
| 9 | .0600 | .0035 |
| 10 | .0730 | .0050 |

The fastener head height F preferably is approximately the same as the depth G of the outer portion of the countersink. In each instance, the outer portion of the countersink is less than 0.006 inch deep and, for cladded skins, preferably does not extend below the clad of the skin panel.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a system for joining an aircraft skin panel to an underlying support member, the skin panel and support member having a hole therethrough and the system including a flush head fastener extending through the hole, the fastener having a shank and an enlarged head portion, the enlarged head portion having a frustoconical underside defining a large included angle ("first angle"), the improvement comprising the hole through the skin panel and support member having a biangular countersink therein adjacent to the exterior surface of the skin panel remote from the support member for receiving the enlarged head portion of the fastener, said biangular countersink including a frustoconical base portion defining an included angle approximately equal to the first angle and a shallow outer portion defining a second included angle much smaller than the first included angle, the depth of the outer portion of the biangular countersink being no greater than 0.006 inch, and the diameter of the countersink at the exterior surface of the skin panel being close to the maximum diameter of the enlarged head portion of the fastener.

2. In the system defined in claim 1, the second included angle being 15° to 20°.

3. In the system defined in claim 1, the second included angle being about 20°.

4. In the system defined in claim 1, the diameter of the countersink at the exterior surface of the skin panel being at least 0.001 inch greater than the maximum diameter of the enlarged head portion of the fastener.

5. In the system defined in claim 1, the fastener head having a height (F) between the frustoconical underside and the top of the enlarged head portion of the fastener approximately equal to the depth of the outer portion of the biangular countersink.

6. In the system defined in claim 1, the countersink including a junction between its base and outer portions, the diameter of the countersink at such junction being 0.0005 inch to 0.0024 inch greater than the maximum diameter (E) of the enlarged head portion of the fastener.

7. In the system defined in claim 1, the skin panel having a thin malleable clad layer over a thicker more rigid underlayer, and the junction of the base and outer portions of the countersink being no more than 0.002 inch below the underside of the clad layer.

8. In the system defined in claim 7, the junction of the base and outer portions of the biangular countersink lying no lower than the bottom of the clad layer.

9. In the system defined in claim 1, the first included angle being about 100° and the second included angle being a small acute angle.

10. In a system for joining an aircraft skin panel to an underlying support member, the skin panel and support member having a hole therethrough and the system including a flush head fastener extending through the hole, the fastener having a shank and an enlarged head portion, the enlarged head portion having a frustoconical underside defining a large included angle ("first angle"), and the skin panel having a thin malleable clad layer disposed over a thicker more rigid underlayer, the improvement comprising the hole through the skin panel and support member having a biangular countersink therein adjacent to the exterior surface of the skin panel remote from the support member which biangular countersink includes a frustoconical base portion defining an included angle approximately equal to the first angle and a shallow outer portion defining a second included angle much smaller than the first included angle, the depth of the outer portion of the biangular countersink being no more than 0.002 inch greater than the thickness of the clad layer.

11. In the system defined in claim 10, the second included angle being 15° to 20°.

12. In the system defined in claim 10, the second included angle being about 20°.

13. In the system defined in claim 10, the diameter of the countersink at the exterior surface of the skin panel being at least 0.001 inch greater than the maximum diameter of the enlarged head portion of the fastener.

14. In the system defined in claim 10, the fastener head having a height (F) between the frustoconical underside and the top of the enlarged head portion of the fastener approximately equal to the depth of the outer portion of the biangular countersink.

15. In the system defined in claim 10, the countersink including a junction between its base and outer portions, the diameter of the countersink at such junction being 0.0005 inch to 0.0024 inch greater than the maximum diameter (E) of the enlarged head portion of the fastener.

16. In the system defined in claim 10, the junction of the base and outer portions of the biangular countersink lying no lower than the bottom of the clad layer.

17. In the system defined in claim 10, the first included angle being about 100° and the second included angle being a small acute angle.

* * * * *